United States Patent
Bouchard

(10) Patent No.: US 8,746,575 B2
(45) Date of Patent: Jun. 10, 2014

(54) SEMI-RIGID RADIO FREQUENCY IDENTIFICATION (RFID) CARD, MANUFACTURING METHOD AND MACHINE FOR ITS PRODUCTION

(75) Inventor: Olivier Bouchard, Romorantin (FR)

(73) Assignee: Paragon Identification, Argent sur Sauldre (FR)

( * ) Notice: Subject to any disclaimer, the term of this patent is extended or adjusted under 35 U.S.C. 154(b) by 668 days.

(21) Appl. No.: 12/753,304

(22) Filed: Apr. 2, 2010

(65) Prior Publication Data

US 2010/0252637 A1 Oct. 7, 2010

(30) Foreign Application Priority Data

Apr. 3, 2009 (FR) ...................................... 09 01618

(51) Int. Cl.
*G06K 19/06* (2006.01)
(52) U.S. Cl.
USPC .......................................... 235/492; 235/487
(58) Field of Classification Search
USPC ................................... 235/487, 492; 156/269
See application file for complete search history.

(56) References Cited

U.S. PATENT DOCUMENTS

| | | | | |
|---|---|---|---|---|
| 4,802,944 | A * | 2/1989 | Benge | 156/247 |
| 6,087,940 | A * | 7/2000 | Caperna et al. | 340/572.5 |
| 6,139,664 | A * | 10/2000 | Melzer et al. | 156/73.1 |
| 6,207,004 | B1 * | 3/2001 | Murasawa | 156/300 |
| 6,305,609 | B1 * | 10/2001 | Melzer et al. | 235/487 |
| 6,639,155 | B1 * | 10/2003 | Bupp et al. | 174/260 |
| 6,659,355 | B1 * | 12/2003 | Fischer et al. | 235/492 |
| 6,951,596 | B2 * | 10/2005 | Green et al. | 156/264 |
| 7,191,507 | B2 * | 3/2007 | Forster et al. | 29/600 |
| 7,245,227 | B2 * | 7/2007 | Winter et al. | 340/686.2 |
| 7,842,152 | B2 * | 11/2010 | Hamilton et al. | 156/227 |
| 7,842,156 | B2 * | 11/2010 | Kline | 156/253 |
| 2004/0078957 | A1 * | 4/2004 | Forster et al. | 29/601 |
| 2004/0188010 | A1 * | 9/2004 | Chaoui | 156/269 |
| 2005/0021172 | A1 * | 1/2005 | Winter et al. | 700/228 |
| 2005/0205202 | A1 * | 9/2005 | Chaoui et al. | 156/269 |
| 2007/0176273 | A1 * | 8/2007 | Wolny | 257/679 |
| 2009/0291271 | A1 * | 11/2009 | Michalk et al. | 428/195.1 |
| 2010/0226107 | A1 * | 9/2010 | Rietzler | 361/760 |

FOREIGN PATENT DOCUMENTS

| | | |
|---|---|---|
| EP | 0706152 | 4/1996 |
| FR | 2847364 | 5/2004 |
| WO | WO9826372 | 6/1998 |
| WO | WO0104834 | 1/2001 |
| WO | WO2006122266 | 11/2006 |
| WO | WO2008047630 | 4/2008 |

OTHER PUBLICATIONS

Copy of International Search Report from priority application No. FR09/01618, filed Apr. 3, 2009.

* cited by examiner

*Primary Examiner* — Paultep Savusdiphol
(74) *Attorney, Agent, or Firm* — Lowe Hauptman & Ham, LLP

(57) ABSTRACT

The invention comprises an RFID card consisting of at least one upper layer, one lower layer, one functional layer comprising at least one electronic component, an antenna connected to the electronic component, wherein the card also comprises a compensator between the functional layer and the lower layer, the compensator being recessed at the location of the electronic component and of thickness substantially equal to the thickness of the electronic component on the functional layer and in that the layers are assembled together by adhesion. The invention also comprises the continuous manufacturing method of the RFID card and the machine according to the manufacturing method of the RFID card.

15 Claims, 3 Drawing Sheets

SEMI-RIGID RADIO FREQUENCY IDENTIFICATION (RFID) CARD, MANUFACTURING METHOD AND MACHINE FOR ITS PRODUCTION

CROSS-REFERENCE TO RELATED APPLICATIONS

The present application claims priority of French Patent Application No. 09/01618, filed on Apr. 3, 2009, which is incorporated herein by reference in its entirety.

TECHNICAL FIELD

The present invention relates to the field of radio-frequency identification (RFID) and more particularly to RFID cards.

BACKGROUND

The present invention proposes a semi-rigid RFID card, its manufacturing method and the machine for making the RFID card.

Radio-frequency identification is increasingly widespread and in order to be used in many fields. This type of identification is generally based on a system constituted by an electronic component and an antenna associated with a backing. This backing may have several shapes. For example, it may be in the form of a label stuck onto a product used in commerce for identifying this product. It can be also in the form of an RFID card, also called a contactless chip card allowing for example identification of persons, thereby authorizing entry into a building or delivery of services to which the identified person has subscribed. Examples of these services are access to public transport or bike-renting service in an urban community or access rates to ski-lift of ski resorts.

RFID cards in current use are made up of several superposed layers. The electronic component and the antenna are situated in a functional layer otherwise known as prelaminate which is the intermediate layer between several layers of plastic. The manufacturing method for these cards commences with superposition of boards. An intermediate board constituting the prelaminate, comprising a plurality of electronic components linked to an antenna, is sandwiched in between several plastic boards. All these layers are then held together by thermoforming. Finally, the thermoformed layers are cut out to create the RFID cards.

This manufacturing method creates RFID cards durable over time, but at an excessive cost. In some fields of use where the RFID card is used for a limited time prior to finally being destroyed, for example, the RFID cards for ski rates where the subscriber to ski-lift services of a ski resort uses the card only for the period of his visit. It is preferable to propose an economical and reliable solution. Also, the semi-rigid ticket can be biodegradable.

The object of the present invention is to provide a technical solution by proposing a semi-rigid RFID card, its manufacturing method and a machine according to the manufacturing method of the semi-rigid RFID card.

In order to achieve this object, the semi-rigid RFID card consists of at least:
one functional layer comprising at least:
one electronic component;
an antenna connected to the electronic component;
one upper layer;
one lower layer;
wherein the card also comprises a compensator between the functional layer and the upper layer or the lower layer, the compensator being recessed at the location of the electronic component and of a thickness substantially equal to the thickness of the electronic component on the functional layer
and in that the layers are assembled together by adhesion.

According to another particularity, the upper layer is in supple synthetic material.

According to another particularity, the upper layer is in paper.

According to another particularity, the upper layer is capable of being printed prior to assembly by adhesion.

According to another particularity, the upper layer comprises a surface capable of being printed by means of an ink jet printer, a laser printer, a thermal printer, via thermal transfer, by sublimation or by rewritable thermal printing.

According to another particularity, the lower layer is in supple synthetic material.

According to another particularity, the lower layer is in paper.

According to another particularity, the lower layer is capable of being printed prior to assembly by adhesion.

According to another particularity, the lower layer comprises a surface capable of being printed by means of an ink jet printer, a laser printer, a thermal printer, via thermal transfer, by sublimation or by rewritable thermal printing.

According to another particularity, the functional layer is in supple synthetic material on which the antenna connected to the electronic component is etched or printed.

According to another particularity, the functional layer is in paper on which the antenna connected to the electronic component is etched or printed.

According to another particularity, the compensator is in supple synthetic material.

According to another particularity, the compensator is in paper.

According to another particularity, the upper layer, the lower layer, the functional layer and the compensator are made of biodegradable material.

Another object is achieved by proposing a manufacturing method of the RFID card, wherein the upper layer, the lower layer and the compensator are fed continuously by reels providing strips with a width at least equal to one of the dimensions of the RFID card, in that the functional layer is fed continuously by at least one reel providing at least one strip in parallel and in that it comprises at least the following steps:
a continuous printing step of the outer surface of the strip of the lower or upper layer;
a continuous recessing step of the strip of the compensator;
a continuous adhesion step of the strip or strips of the compensator on the inner face of the strip of the lower layer or of the strip of the upper layer;
a step for continuous placing of electronic components coinciding with the recesses of the strip of the compensator;
a continuous adhesion step of the strip or strips of functional layers on the inner face of the strip of the upper layer or of the strip of the lower layer;
a continuous cut-out step;
an on-line customization step.

According to another particularity, the continuous printing step of the outer surface of the strip of the lower layer is followed by a continuous printing step of the outer surface of the strip of the upper layer.

According to another particularity, the continuous printing step of the outer is surface of the strip of the lower layer is preceded by a continuous printing step of the outer surface of the strip of the upper layer.

According to another particularity, the recessing step of the strip of the compensator is carried out continuously by a holing system.

According to another particularity, the recesses of the strip of the compensator have a form and dimensions suitable for housing each electronic component in a recess.

According to another particularity, the continuous adhesion step of the strip or strips of the compensator on the inner face of the strip of the lower layer or of the upper layer is followed by a continuous pressurising step of the strip of the compensator and of the strip of the lower layer or of the upper layer.

According to another particularity, the continuous adhesion step of the strip or strips of functional layers on the inner face of the strip of the upper layer or of the strip of the lower layer is followed by a continuous pressurising step of the strip of the lower layer, of the strip of the compensator, of the strips of functional layers and of the strip of the upper layer.

According to another particularity, the continuous printing step of the outer surface of the strip of the lower layer is followed by a continuous tension stabilisation step of the strip of the lower layer.

According to another particularity, the continuous pressurising step of the strip of the compensator and of the strip of the lower layer or of the upper layer is followed by a continuous tension stabilisation step of the strip of the upper layer or of the strip of the lower layer.

According to another particularity, the continuous cut-out step comprises longitudinal cut-out of the assembled strips then winding in the form of reels.

According to another particularity, the continuous cut-out step comprises longitudinal and transversal cutting of the assembled strips then folding in the form of fan folds.

According to another particularity, the continuous cut-out step comprises cutting out the assembled strips into individual RFID cards.

According to another particularity, the continuous cut-out step of RFID cards is followed by an on-line control step by means of a reading antenna.

According to another particularity, the on-line control step is followed by a continuous customization step.

According to another particularity, the customization step is followed by a conditioning step.

Another object is achieved by proposing a production machine according to the manufacturing method of the RFID card comprising an in line succession of stations including at least:
- a reel feeding station for the lower layer,
- a reel feeding station for the upper layer,
- if needed, at least one station for printing on the outer face of the upper layer or of the lower layer
- an adhesion deposit station on the inner face of the lower layer,
- an adhesion deposit station on the compensator,
- an adhesion deposit station on the inner face of the upper layer.

According to another particularity, the machine further includes:
- a reel feeding station for the compensator,
- a recess station of the compensator.

According to another particularity, the machine also comprises:
- a station comprising at least a reel feeding module for strip of functional layers.

BRIEF DESCRIPTION OF THE DRAWINGS

Other particularities and advantages of the present invention will become more clearly apparent upon reading the description hereafter, made with reference to the appended drawings, wherein.

DETAILED DESCRIPTION OF THE INVENTION

Figure 1:
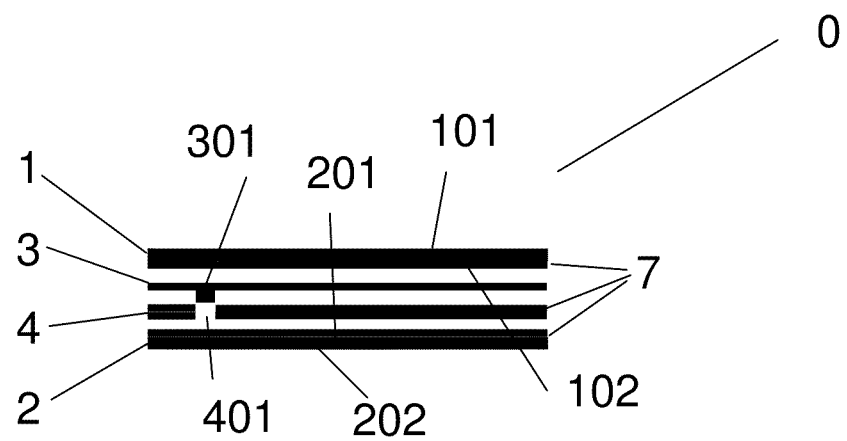
FIG. 1 illustrates a sectional view of the RFID card.
Figure 2:
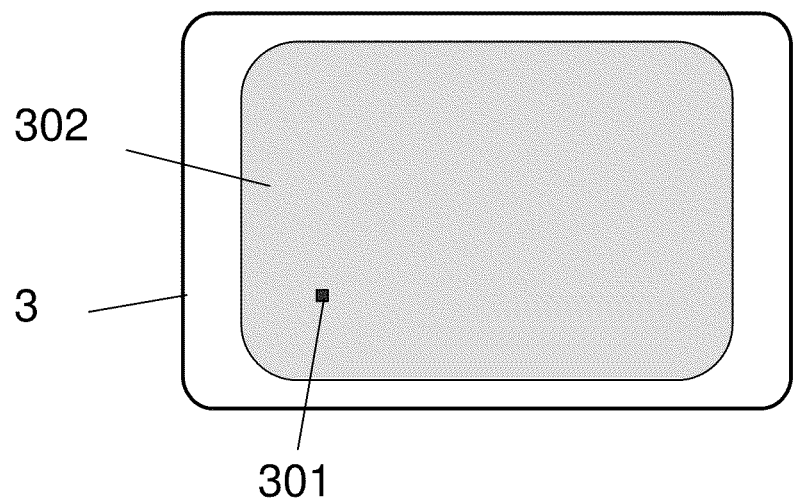
FIG. 2 illustrates a plan view of the functional layer comprising the electronic component and its antenna.

With reference to FIGS. 1 and 2, the invention relates to an RFID card (0) consisting of at least:
- one functional layer (3) made of supple material comprising at least:
  - one electronic component (301);
  - one antenna (302) connected to the electronic component (301);
- one upper layer (1) made of supple material;
- one lower layer (2) made of supple material;
- one compensator (4) made of supple material.

The upper layer (1) for example is a backing of thickness varying for example from 50 µm to 400 µm.

The substance of the upper layer (1) is for example paper or a supple synthetic substance such as polypropylene, PVC (polyvinyl chloride) or PET (polyethylene terephthalate or polyester).

The compensator (4) is a backing of thickness lower than, for example, 400 µm, the value of the thickness varying, for example, from 50 µm to 400 µm. The width and the length of the compensator (4) are lower or equal to the width and the length of the RFID card (0).

The substance of the compensator (4) is for example paper or a supple synthetic substance such as polypropylene, PVC (polyvinyl chloride) or PET (polyethylene terephthalate or polyester)

The functional layer (3) is a backing on which is etched or printed an antenna (302), for example, made of aluminium, connected to an electronic component (301) with integrated circuit. According to the product and type of protocol, the design of the antenna (302) and the type of the electronic component (301) are variable.

The substance of the functional layer (3) is for example paper or a supple synthetic substance such as polypropylene, PVC (polyvinyl chloride) or PET (polyethylene terephthalate or polyester)

The lower layer (2) is for example a backing having a thickness varying for example from 50 µm to 400 µm.

The substance of the lower layer (2) is for example paper or a supple synthetic substance such as polypropylene, PVC (polyvinyl chloride) or PET (polyethylene terephthalate or polyester)

Advantageously, the lower layer (2), the upper layer (1), the compensator (4) and the functional layer (3) are stuck together by, for example, a hot melt adhesive (7), or an adhesive having an aqueous base or solvent base or any other adhesive suitable for efficaciously and durably holding the layers of the RFID card (0) together.

The functional layer (3) is sandwiched between the upper layer (1) and the lower layer (2).

To compensate for the thickness of the electronic component (301) integrated on the functional layer (3), a compensating layer or otherwise called a compensator (4) is located between the functional layer (3) and the lower layer (2). The compensator (4) undergoes recessing so that the electronic component (301) can be housed in the recess (401) of the compensator (4) when the functional layer (3) is stuck on the compensator (4). The compensator (4) compensates the thickness of the electronic component (301) protruding from the surface of the functional layer (3) and the layer of adhesive between the functional layer (3) and the compensator (4) by having a thickness substantially equal to the thickness of the electronic component (301) protruding from the surface of the functional layer plus the thickness of adhesive.

According to another configuration, the compensator (4) is located between the functional layer (3) and the upper layer (1).

An antenna (302), for example made of aluminium, integrated into the functional layer (3), is connected to the electronic component (301). The electronic component (301) is placed according to the use of the RFID card.

According to a configuration, the upper layer (1) has a thermal surface capable of being printed by a thermal printer.

According to another configuration, the upper layer (1) has a surface capable of being printed via thermal transfer.

According to another configuration, the upper layer (1) has a surface capable of being printed by an ink jet printer.

According to another configuration, the upper layer (1) has a surface capable of being printed by a laser printer.

According to another configuration, the upper layer (1) has a rewritable thermal face.

According to a configuration, the upper layer (1) has a face capable of being printed by sublimation.

According to a configuration, the lower layer (2) has a thermal surface capable of being printed by a thermal printer.

According to another configuration, the lower layer (2) has a surface capable of being printed via thermal transfer.

According to another configuration, the lower layer (2) has a surface capable of being printed by an ink jet printer.

According to another configuration, the lower layer (2) has a surface capable of being printed by a laser printer.

According to a configuration, the lower layer (2) has a rewritable thermal face.

According to a configuration, the lower layer (2) has a face capable of being printed by sublimation.

Figure 3:
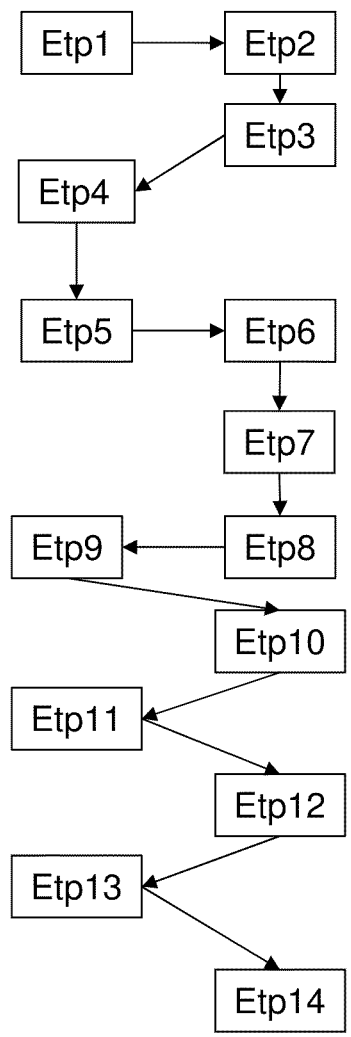
FIG. 3 illustrates the method for making the RFID card.

With reference to FIG. 3, the manufacturing method of the RFID card (0) comprises several steps which create the printing, the complexing and the shaping of the RFID card (0) during a single pass on a press (5).

The press (5) can be, in a non-limiting way, a flexographic press.

Before being sent to the press (5), the lower layer (2), the upper layer (1) and the compensator (4) are fed continuously by reels (203, 103, 403) providing strips of width at least equal to one of the dimensions of the RFID card (0) enabling continuous production of RFID cards (0).

The functional layer (3) is fed continuously by at least one reel (3031, 3032) providing at least one strip in parallel enabling continuous series production of at least one RFID card (0).

According to a configuration, the width of the assembled strips is at least equal to the width of the RFID card (0).

According to another configuration, the width of the strips is at least equal to the length of the RFID card (0).

In a first step (Etp1), the strip of the reel (203) constituting the lower layer (2) is unwound to allow continuous pre-printing of the outer surface (202) of the strips of the lower layers (2) for a plurality of cards.

In a following step (Etp2), the strip of the lower layer (2) is stabilised in tension.

In a following step (Etp3), the strip of the reel (103) constituting the material of the upper layer (1) is unwound to enable optional continuous printing of the outer surface (101) of the strips of the upper layers (1) for a plurality of cards.

According to another configuration, in the first step (Etp1), the strip of the reel (103) constituting the upper layer (1) is unwound to allow continuous pre-printing of the outer surface (101) of the strips of the upper layers (1) for a plurality of cards. In a following step (Etp2), the strip of the upper layer (1) is stabilised in tension. In a following step (Etp3), the strip of the reel (203) constituting the material of the lower layer (2) is unwound to enable optional continuous printing of the outer surface (202) of the strips of the lower layers (2) for a plurality of cards.

In a following step (Etp4), the strip of the compensator (4) continuously undergoes a plurality of recesses (401). The recess (401) is made by a holing system, for example, by a block which recesses by punch or by a "shock air" system which both recesses and expels the recessed part.

In a following step (Etp5), continuous adhesion of the strip of the recessed compensator (4) on the inner surface (102) of the strip of the lower layer (1) is carried out continuously.

According to another configuration, in a following step (Etp5), continuous adhesion of the strip of the recessed compensator (4) on the inner surface (201) of the strip of the upper layer (2) is carried out continuously.

In a following step (Etp6), the strip of the recessed compensator (4) and the strip of the upper layer (1) continuously undergo pressurising after adhesion.

According to another configuration, in a following step (Etp6), the strip of the recessed compensator (4) and the strip of the lower layer (2) undergo continuous pressurising after adhesion.

In a following step (Etp7), the strip of the lower layer (2) is stabilised in tension.

According to another configuration, in a following step (Etp7), the strip of the upper layer (1) is stabilised in tension.

In a step (Etp8), the reels constituted by functional layers (3) are unwound continuously.

In a following step (Etp9), adhesion of the strips of functional layers (3) on the strip of the compensator (4) is done continuously by placing the electronic component (301) in coincidence with the recess (401) of the compensator (4).

In a following step (Etp10), the strips of functional layers (3) and the strip of the compensator (4) undergo continuous pressurising after adhesion.

In a following step (Etp11), adhesion of the strips of functional layers (3) on the inner surface (201) of the strip of the upper layer (1) is carried out continuously.

According to another configuration, in a following step (Etp11), adhesion of the strips of functional layers (3) on the inner surface (102) of the strip of the lower layer (2) is carried out continuously.

In a following step (Etp12), the strips of functional layers (3), the compensator (4), the strips of the upper layer (1) and the strip of the lower layer (2) undergo continuous pressurising after adhesion.

In a following step (Etp13), the RFID cards (0) are cut out continuously.

According to a configuration, the strips assembled in the preceding steps are cut out longitudinally continuously to produce a plurality of strips of dimensions at least equal to the length or the width of an RFID card (0) and whereof the number of strips is equal to the number of reels of functional layers (3). Each obtained strip is then wound up as bobbins.

According to another configuration, the strips assembled in the preceding steps are continuously cut out longitudinally and transversally to obtain a plurality of strips with dimensions at least equal to the width of an RFID card (0) and the number of strips of which is equal to the number of reels of functional layers (3). Each strip is subject to a series of perforation lines for easy folding and separating of the RFID cards (0). The distance between each line of perforation is equal to at least the width or the length of the RFID card (0). The RFID cards are then presented in the form of fanfolds.

According to another configuration, the strips assembled in the preceding steps are cut out into individual RFID cards (0).

In a following step (Etp14), proper operation of each electronic component system (301) connected to an antenna (302) of each RFID card is continuously controlled by an RFID reading antenna.

In a following step, not shown, each electronic component associated with a card is subject to customization. Regardless of the presentation of the product in bobbins, in fanfolds or in individual cards, during customization, according to the needs, reading, coding and numbering of the electronic component (301) then allowing its printing are possible, as well as the creation of a log file or any other type of file according to demand.

In a following step, not shown, the bobbins, the fanfolds and the individual cards are conditioned depending on the needs or on request from a client.

Figure 4:
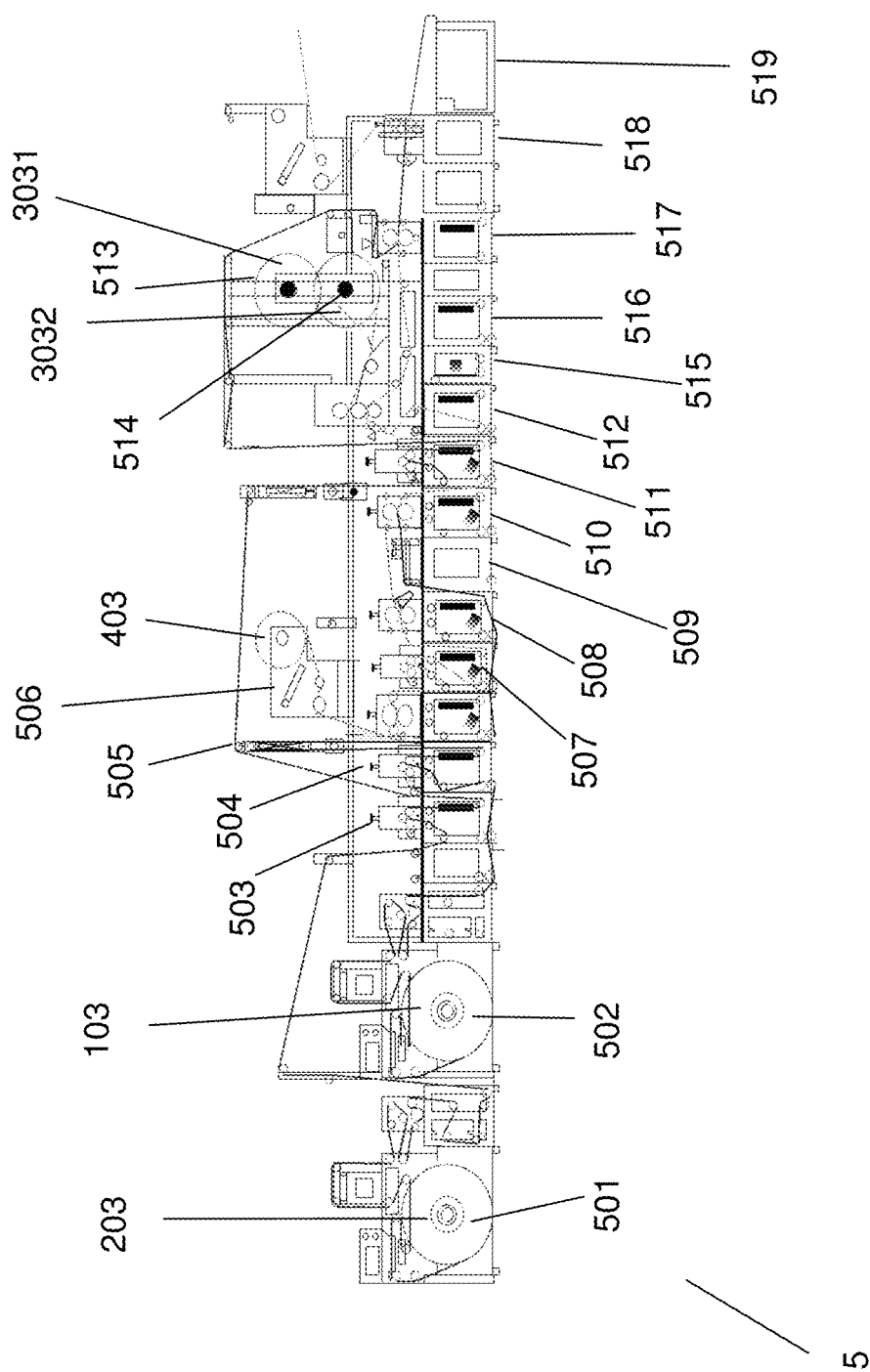
FIG. 4 illustrates the machine according to the method for manufacturing the RFID card.

With reference to FIG. 4, the production machine (5) according to the method for making the RFID card (0) includes an in line succession of stations including at least:
  a reel (203) feeding station (501) for the optionally pre-printed lower layer (2),
  a reel (103) feeding station (502) for the upper layer (1),
  at least one station (504) for printing on the outer face of the upper layer (1) if needed.
Preferentially, the production machine (5) further includes:
  a reel (403) feeding station (506) for the compensator (4),
  a printing station (507) on the compensator (4) of the recess (401) for the electronic component (301) and of the positioning of the functional layer (3),
  a recessing station (508) of the compensator (4).
Preferentially, the production machine (5) further includes:
  a station (513) comprising at least one reel (3031, 3032) feeding module for strips of functional layers (3).
Preferentially, the production machine (5) further includes:
  a stabilisation station (503) of the upper layer (1) if needed,
  an adhesion (7) deposit station (509) on the inner face (102) of the lower layer (2),
  a rolling station (510) of the lower layer (2) and of the compensator (4),
  a tension stabilisation station (511) of the lower layer (2) if needed,
  an adhesion (7) deposit station (512) on the compensator (4),
  a rolling station (515) of the compensator (4) and upper layer (1) assembly with the functional layer (3),
  an adhesion (7) deposit station (516) on the inner face of the upper layer (1),
  a rolling station (517) of the compensator (4), upper layer (1) and functional layer (3) assembly on the lower layer (2),
  a cutting station (518) of the RFID cards (0),
  a control station (519) of the RFID cards (0).

It should be obvious for the person skilled in the art that the present is invention allows embodiments under many other specific forms without departing from the field of application of the invention as claimed. Therefore, the present embodiment should be considered as an illustration, but may be modified within the field defined by the scope of the appended claims, and the invention should not be limited to the details given above.

The invention claimed is:

1. A manufacturing method for a semi-rigid RFID card, the method comprising the following steps in the following order:
  continuously feeding strips by reels, said strips each having a width at least equal to a dimension of a RFID card and defining an upper layer, a lower layer, and a compensator of the RFID card;
  continuously printing an outer surface of the strip of the lower layer;
  continuously recessing the strip of the compensator to form a recess;
  continuously adhering the strip of the compensator to an inner face of the strip of the lower layer or to an inner surface of the strip of the upper layer with a layer of adhesive durably holding the strip of the compensator with the strip of the lower layer or with the strip of the upper layer;
  continuously feeding at least one strip of a functional layer of the RFID card by at least another reel, the at least one strip of the functional layer having an antenna etched or printed thereon;
  continuously adhering the at least one strip of the functional layer to the strip of the compensator by placing an electronic component from the at least one strip of the functional layer in coincidence with the recess of the strip of the compensator after having continuously adhered the strip of the compensator to an inner face of the strip of the lower layer or to an inner surface of the strip of the upper layer, and after having continuously fed at least one strip of the functional layer;
  continuously pressurising the at least one strip of the functional layer with the strip of the compensator after placing the electronic component in coincidence with the recess of the strip of the compensator;
  continuously adhering the at least one strip of the functional layer to the inner face of the strip of the upper layer or to the inner face of the strip of the lower layer with another layer of adhesive durably holding the strip of the functional layer with the strip of the upper layer or the strip of the lower layer; and
  continuously cutting.

2. The manufacturing method as claimed in claim 1, wherein the continuously printing the outer surface of the strip of the lower layer is followed by continuously printing the outer surface of the strip of the upper layer.

3. The manufacturing method as claimed in claim 1, wherein the continuously printing the outer surface of the strip of the lower layer is preceded by continuously printing the outer surface of the strip of the upper layer.

4. The manufacturing method as claimed in claim 1, wherein the continuously recessing the strip of the compensator is carried out continuously by a holing system.

5. The manufacturing method as claimed in claim 1, wherein the recess of the strip of the compensator has a form and dimensions to house each electronic component in each recess.

6. The manufacturing method as claimed in claim 1, wherein the continuously adhering the strip of the compensator to the inner face of the strip of the lower layer or to the inner face of the strip of the upper layer is followed by continuously pressurising the strip of the compensator and the strip of the lower layer or the strip of the upper layer.

7. The manufacturing method as claimed in claim 1, wherein the continuously adhering the strip of the functional layer or strips of functional layers to the inner face of the strip of the upper layer or to the inner face of the strip of the lower layer is followed by continuously pressurising the strip of the lower layer, the strip of the compensator, the strips of the functional layers, and the strip of the upper layer.

8. The manufacturing method as claimed in claim 1, wherein the step of continuously printing the outer surface of the strip of the lower layer is followed by continuously stabilizing the strip of the lower layer.

9. The manufacturing method as claimed in claim 1, wherein the continuously pressurising the strip of the compensator and the strip of the lower layer or the strip of the upper layer is followed by continuously tension stabilizing the strip of the upper layer or the lower layer.

10. The manufacturing method as claimed in claim 1, wherein the continuously cutting comprises longitudinal cutting the strips of the functional layer, of the compensator, of the upper layer, and of the lower layer, then winding up in the form of bobbins.

11. The manufacturing method as claimed in claim 1, wherein the continuously cutting comprises longitudinal and transversal cutting the strips of the functional layer, of the compensator, of the upper layer, and of the lower layer, then folding in the form of fanfolds.

12. The manufacturing method as claimed in claim 1, wherein the continuously cutting comprises cutting the strips of the functional layer, of the compensator, of the upper layer, and of the lower layer, which are assembled into individual RFID cards.

13. The manufacturing method as claimed in claim 1, wherein the continuously cutting is followed by an on-line control step by a reading antenna.

14. The manufacturing method as claimed in claim 13, wherein the on-line control step is followed by a continuous customization step.

15. The manufacturing method as claimed in claim 14, wherein the continuous customization step is followed by a conditioning step.

* * * * *